(12) United States Patent
Liu

(10) Patent No.: US 6,737,444 B1
(45) Date of Patent: May 18, 2004

(54) METHOD OF MAKING SILICONE RESIN EMULSIONS

(75) Inventor: Yihan Liu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/346,544

(22) Filed: Jan. 16, 2003

(51) Int. Cl.$^7$ .................................................. B01F 3/08
(52) U.S. Cl. ........................................ 516/55; 524/588
(58) Field of Search ............................. 516/55; 524/588

(56) References Cited

U.S. PATENT DOCUMENTS

| | | | |
|---|---|---|---|
| 4,620,878 A | * 11/1986 | Gee .............................. 516/55 |
| 5,234,495 A | * 8/1993 | Breneman et al. ........ 106/287.1 |
| 5,246,694 A | 9/1993 | Birthwistle .................. 424/70 |
| 5,302,658 A | 4/1994 | Gee et al. .................... 524/732 |
| 5,319,120 A | 6/1994 | Gilson et al. ................ 556/453 |
| 5,326,483 A | * 7/1994 | Halloran et al. ............. 510/122 |
| 5,710,113 A | 1/1998 | Wells .......................... 510/122 |
| 5,723,521 A | 3/1998 | Cook et al. ................. 524/268 |
| 5,741,876 A | 4/1998 | Carpenter, II et al. ........ 528/10 |
| 6,180,117 B1 | * 1/2001 | Berthiaume et al. ......... 424/401 |
| 6,235,834 B1 | 5/2001 | Gee et al. .................... 524/837 |
| 6,323,268 B1 | * 11/2001 | Fisher et al. ................. 524/266 |
| 6,340,662 B1 | * 1/2002 | Millhoff et al. .............. 510/417 |
| 6,545,086 B1 | * 4/2003 | Kosal ........................... 524/806 |

\* cited by examiner

*Primary Examiner*—Margaret G. Moore
(74) *Attorney, Agent, or Firm*—Jim L. DeCesare

(57) ABSTRACT

A method is provided for making aqueous silicone resin containing emulsions by (i) mixing a silicone resin or a blend of a silicone resin and a non-resinous silicone polymer, with an inversion assisting polymer to form a homogeneous oil phase; (ii) mixing one or more surfactants with the homogenous oil phase in (i) to form a mixture; (iii) adding sufficient water to the mixture in (ii) to cause an inversion of the continuous phase and the dispersed phase, and forming an oil-in-water emulsion; (iv) diluting the oil-in-water emulsion in (iii) by adding more water; and (v) recovering an oil-in-water emulsion containing silicones having a particle size in range of 100 nanometer to 5,000 nanometer (0.1 to 5.0 micron). The inversion assisting polymer is a silicon functional or an organofunctional polysiloxane having in its molecule a silicon functional or an organofunctional group such as hydroxyl, alkoxy, amino, epoxidized amino, glycidyl, polyoxyethylene oxypropylene, carboxyl, mercapto, quaternary ammonium, or combinations thereof.

6 Claims, No Drawings

METHOD OF MAKING SILICONE RESIN EMULSIONS

FIELD OF THE INVENTION

Silicone MQ resins or silicone MQ resin/silicone polymer blends containing high levels of an MQ resin are known in the art to be difficult to emulsify by direct emulsification using high shear or by inversion. This invention is directed to a method of emulsifying silicone MQ resin/ polydiorganosiloxane blends by employing, what is referred to herein, as an inversion assisting polymer. In particular, the inversion assisting polymer comprises a silicone polymer or a silicone copolymer containing polar functional groups. Some examples of suitable polar functional groups are amino groups, epoxidized amino groups, quaternary ammonium groups, glycidyl groups, mercapto groups, carboxyl groups, polyoxyethylene oxypropylene groups, or combinations thereof. The inversion assisting polymer can be incorporated at levels as low as 4 percent by weight based on the total amount of silicone content. When incorporated, silicone MQ resin/polydiorganosiloxane blends at a resin:polymer ratio of 25:75 to 70:30 can be readily inverted by a mechanism known in the art as catastrophic inversion. This enables oil-in-water (O/W) silicone resin emulsions to be obtained using most conventional nonionic surfactants in a conventional mixer. The method provides aqueous silicone resin emulsions that have been heretofore not been obtainable otherwise.

BACKGROUND OF THE INVENTION

Water-based delivery of silicone resin materials is desired in many applications. However, the emulsification of silicone resins of the structural type MQ, and blends of MQ silicone resins and silicone polymers, with high levels of MQ resins, i.e., containing 20–90 percent by weight based on the total silicone content, and forming oil-in-water emulsions by conventional means is known to be difficult. For example, while conventional techniques such as direct emulsification using high shear are suitable for low viscosity blends, and emulsification by catastrophic inversion is suitable for high viscosity blends, neither is suitable when MQ resins are present. In particular, the presence of a high level of silicone MQ resins in a silicone resin/silicone polymer blend significantly increases the oil phase viscosity, such that a direct emulsification using high shear fails to yield the particle size most desired for emulsion stability. In addition, the presence of a significant amount of silicone MQ resin also makes the oil phase resistant to inversion, to the extent that often the oil phase remains non-inverted at any water-to-oil ratio.

While mixing a volatile silicone fluid, a volatile organic fluid, or a low molecular weight diluent, with a high silicone resin content oil phase can ease the process of emulsification, such volatile compositions or low molecular weight fluids may not be desired in a given formulation, such that successful emulsification of a silicone MQ resin containing material is limited. In contrast, the present invention provides an effective way of emulsifying materials containing high levels of silicone MQ resins. This is enabled according to the present method by using a small amount of a secondary silicone polymer, referred to herein as the inversion assisting polymer. Its function is to ease the inversion process during emulsification. It has been found that the presence of the inversion assisting polymer does not adversely affect performance of the final formulation. In fact, the inversion assisting polymer can contribute to the final formulation some desirable attributes of its own.

SUMMARY OF THE INVENTION

This invention relates to a method of making aqueous silicone resin emulsions containing silicone particles having a particle size in range of 100 nanometer to 5,000 nanometer (0.1 to 5.0 micron). According to the method, the silicone resin emulsions can be obtained by (i) mixing a silicone resin or a blend of a silicone resin and a non-resinous silicone polymer with an inversion assisting polymer, and forming a homogeneous oil phase.

In the second step of the method, (ii) one or more surfactants are mixed with the homogenous oil phase in (i) to form a mixture. By (iii) adding sufficient water to the mixture formed in (ii), inversion of the continuous phase and the dispersed phase is caused to occur resulting in an oil-in-water emulsion. In step (iv), the oil-in-water emulsion formed in (iii) is diluted by the addition of more water; and (v) an oil-in-water emulsion containing silicone particles with sizes in range of 100 nanometer to 5,000 nanometer (0.1 to 5.0 micron) is recovered.

The inversion assisting polymer can be silicon functional or organofunctional. The polysiloxane contains in its molecule at least one functional group. Some representative functional groups include hydroxyl groups, alkoxy groups, amino groups, epoxidized amino groups, glycidyl groups, polyoxyethylene oxypropylene groups, carboxyl groups, mercapto groups, quaternary ammonium groups, or combinations of such groups.

The contribution of the present invention to the state of the art is that it enables those skilled in the art to use inversion processing techniques for making aqueous emulsions containing silicone resins. These and other features of the invention will become apparent from a consideration of the detailed description.

DETAILED DESCRIPTION OF THE INVENTION

A phase inversion generally occurs when the continuous phase of a dispersion becomes the dispersed phase, or vice versa. Phase inversions in liquid/liquid dispersions are categorized as either catastrophic inversions or transitional inversions. Catastrophic inversions can be caused by simply changing the phase ratio until there is such a high ratio of the dispersed phase that it becomes the continuous phase. In contrast, transitional inversions occur when the affinity of the surfactant for the two phases is altered in order to bring about the inversion. For purposes of the present invention, inversion as used herein is intended to mean a catastrophic inversion.

The acronym MQ as used herein is derived from four symbols M, D, T, and Q, which represent the functionality of structural units present in organosilicon compounds containing siloxane units joined by $\equiv$Si—O—Si$\equiv$ bonds. The monofunctional (M) unit represents $(CH_3)_3SiO_{1/2}$; the difunctional (D) unit represents $(CH_3)_2SiO_{2/2}$; the trifunctional (T) unit represents $CH_3SiO_{3/2}$ and results in the formation of branched linear siloxanes; and the tetrafunctional (Q) unit represents $SiO_{4/2}$ which results in the formation of crosslinked and resinous compositions. Hence, MQ is used when the siloxane contains all monofunctional M units and tetrafunctional Q units, or a high percentage of M and Q units such as to render it resinous.

The oil phase of the emulsion according to the present invention therefore consists of a blend of a silicone MQ resin and a non-resinous silicone polymer, as well as a small amount of a secondary silicone polymer hereafter referred to as the "inversion assisting polymer".

The silicone resin is a non-linear siloxane resin with a glass transition temperature (Tg) above 0° C. The glass transition temperature is the temperature at which an amorphous material such as a higher polymer changes from a brittle vitreous state to a plastic state. The silicone resin used herein otherwise has the general formula $R'_aSiO_{(4-a)/2}$ wherein R' is a monovalent hydrocarbon group with 1–6 carbon atoms or R' can be a functionally substituted hydrocarbon group with 1–6 carbon atoms, and a has an average value of 1–1.8. The resin preferably consists of monovalent trihydrocarbonsiloxy (M) groups $R''_3SiO_{1/2}$ and tetrafunctional (Q) groups $SiO_{4/2}$, in which R" is a monovalent hydrocarbon group having 1–6 carbon atoms. R" is most preferably a methyl group. The number ratio of M groups to Q groups is in the range of 0.5:1 to 1.2:1, so as to provide an equivalent wherein a in the formula $R'_aSiO_{(4-a)/2}$ has an average value of 1.0–1.63. Preferably, the number ratio is 0.6:1 to 0.9:1. If desired, the silicone resin may also contain 1–5 percent by weight of a silicon-bonded hydroxyl radical such as the dimethylhydroxysiloxy $(HO)(CH_3)_2SiO_{1/2}$ unit.

The non-resinous silicone polymer can be a linear polysiloxane or a cyclic polysiloxane with a Tg below –20° C. It is preferably a polydiorganosiloxane containing hydrocarbon groups having 1–6 carbon atoms or containing functionally substituted hydrocarbon groups having 1–6 carbon atoms. Most preferably, at least 80 percent of the groups should be methyl groups. Polydiorganosiloxanes most preferred are polydimethylsiloxanes terminated with hydroxyl groups or trimethylsiloxy groups. Such polydiorganosiloxanes typically have a viscosity of 0.65–60,000 centistoke ($mm^2/s$). Linear and cyclic polysiloxanes useful herein can be volatile species.

As used herein, the term volatile as the term it applies to silicones, is intended to mean siloxanes having a boiling point less than about 250° C. and a viscosity of 0.65–5.0 centistoke ($mm^2/s$). Such compositions typically comprise cyclic alkyl siloxanes of the formula $(R_2SiO)_p$ or linear alkyl siloxanes of the formula $R_3SiO(R_2SiO)_qSiR_3$ in which R is an alkyl group containing 1–6 carbon atoms, p is 3–6 and q is 0–5. Most preferred are the volatile cyclic methyl siloxanes of the formula $\{(CH_3)_2SiO\}_p$ and the volatile linear methyl siloxanes of the formula $(CH_3)_3SiO\{(CH_3)_2SiO\}_qSi(CH_3)_3$ in which p is 3–6 and q is 0–5, respectively.

Some representative examples of linear volatile methyl siloxanes are hexamethyldisiloxane with a boiling point of 100° C., viscosity of 0.65 $mm^2/s$, and formula $Me_3SiOSiMe_3$; octamethyltrisiloxane with a boiling point of 152° C., viscosity of 1.04 $mm^2/s$, and formula $Me_3SiOMe_2SiOSiMe_3$; decamethyltetrasiloxane with a boiling point of 194° C., viscosity of 1.53 $mm^2/s$, and formula $Me_3SiO(Me_2SiO)_2SiMe_3$; dodecamethylpentasiloxane with a boiling point of 229° C., viscosity of 2.06 $mm^2/s$, and formula $Me_3SiO(Me_2SiO)_3SiMe_3$; tetradecamethylhexasiloxane with a boiling point of 245° C., viscosity of 2.63 $mm^2/s$, and formula $Me_3SiO(Me_2SiO)_4SiMe_3$; and hexadecamethylheptasiloxane with a boiling point of 270° C., viscosity of 3.24 $mm^2/s$, and formula $Me_3SiO(Me_2SiO)_5SiMe_3$. Me in these formulas and in formulas which follow represents the methyl group $CH_3$.

Some representative examples of cyclic volatile methyl siloxanes are hexamethylcyclotrisiloxane, a solid at room temperature, with a boiling point of 134° C. and formula $(Me_2SiO)_3$; octamethylcyclotetrasiloxane with a boiling point of 176° C., viscosity of 2.3 $mm^2/s$, and formula $(Me_2SiO)_4$; decamethylcyclopentasiloxane with a boiling point of 210° C., viscosity of 3.87 $mm_2/s$, and formula $(Me_2SiO)_5$; and dodecamethylcyclohexasiloxane with a boiling point of 245° C., viscosity of 6.62 $mm^2/s$, and formula $(Me_2SiO)_6$.

The ratio of the silicone resin to the non-resinous silicone polymer in the blend is 5:95 to 95:5 by weight, preferably 20:80 to 70:30, and most preferably 30:70 to 70:30. The blend of the silicone resin and non-resinous silicone polymer can be obtained either by (i) directly mixing the silicone resin and non-resinous silicone polymer to form a homogenous mixture in the form of a clear solution, or by (ii) mixing an organic solvent solution of the silicone resin and the non-resinous silicone polymer, and then stripping the organic solvent by vacuum distillation at an elevated temperature.

Blends of the silicone resin and the non-resinous silicone polymer can be delivered in the form of silicone pressure sensitive adhesive if desired. Such compositions can be prepared by mixing a silanol-terminated polydiorganosiloxane having a Tg below –20° C., with a silanol-containing silicone resin having a Tg above 0° C., and lightly cross-linking the mixture by condensation of the silanol groups in the polydiorganosiloxane with the silanol groups in the silicone resin. Such silicone pressure sensitive adhesives include (i) 20–80 parts by weight, preferably 30–60 parts, of the silanol-terminated polydiorganosiloxane with a Tg below –20° C., and (ii) 20–80 parts by weight, preferably 40–70 parts, of the silanol-containing silicone resin with a Tg above 0° C.

Particularly preferred silicone pressure sensitive adhesive compositions can be prepared by mixing (i) 30–60 parts by weight of the silanol-terminated polydiorganosiloxane with a Tg below –20° C. and a viscosity of 0.1–30000 Pa.s at 25° C., with (ii) 40–70 parts by weight of the silanol-containing silicone resin with a Tg above 0° C. The silanol-containing silicone resin should include monovalent trihydrocarbonsiloxy (M) groups of the formula $R''_3SiO_{1/2}$ and tetrafunctional (Q) groups of the formula $SiO_{4/2}$, in which R" is a monovalent hydrocarbon group having 1–6 carbon atoms, and the number ratio of M groups to Q groups is in the range 0.5:1 to 1.2:1. Suitable silicone pressure sensitive adhesive compositions can be made in accordance with the method described in U.S. Pat. No. 5,319,120 (Jun. 7, 1994).

In an alternate and similar embodiment, the blend of the silicone resin and the non-resinous silicone polymer can be delivered in the form of a mixture of a silicone pressure sensitive adhesive as noted above, and an additional linear or cyclic polysiloxane having a glass transition temperature below –20° C. In this alternate embodiment, the additional polysiloxane most suitable is a polydiorganosiloxane containing hydrocarbon groups having 1–6 carbon atoms or functionally substituted hydrocarbon groups having 1–6 carbon atoms, and a viscosity of 0.65–60,000 centistoke ($mm^2/s$). The ratio of the silicone resin to the total non-resinous silicone polymer in composition of the mixture containing the silicone pressure sensitive adhesive and the additional linear or cyclic polysiloxane should be 5:95 to 95:5 by weight, preferably 20:80 to 70:30 by weight, and most preferably 30:70 to 70:30 by weight.

The inversion assisting polymer which is used according to the this invention is a silicon functional polysiloxane or an organofunctional polysiloxane. By silicon functional is meant that the functional group is directly attached to a silicon atom. By organofunctional is meant that the functional group is attached to a silicon atom generally via divalent radicals such as alkylene groups. Suitable inversion assisting polysiloxanes generally have the formula: $R''''_a R'_{3-a} SiO(R'_2SiO)_x(R'R''SiO)_y(R'R'''SiO)_zSiR'_{3-a}R''''_a$ wherein R' represents the same or a different monovalent hydrocarbon groups having 1–6 carbon atoms; R'', R''' and R'''' each represent the same or a different silicon functional group or an organofunctional group such as an hydroxyl group, an alkoxy group, an amino group, an epoxidized amino group, a glycidyl group, a polyoxyethylene oxypropylene group, a carboxyl group, a mercapto group, a quaternary ammonium group, or combinations of such groups. The group can be either directly linked to a silicon atom or linked to a silicon atom via a divalent alkylene linking radical. In the formula, a is 0 or 1, and the ratio of x to (y+z) is 99.5:0.5 to 90:10.

Some particular examples of suitable organofunctional groups which can be included in the inversion assisting polymer are hydroxyl groups such as $\equiv SiOH$ or $\equiv SiCH_2CH_2CH_2OH$, alkoxy groups such as $\equiv SiOC_2H_5$ or $\equiv SiCH_2CH_2CH_2OC_2H_5$, amino groups such as $\equiv SiCH_2CH_2CH_2NH_2$, epoxidized amino groups such as $\equiv SiC_4H_8NRC_2H_4NR_2$ where R is about 20 percent hydrogen and about 80 percent of the group $—CH_2CH_2CH(OH)CH_2OH$; glycidyl groups such as $\equiv Si(CH_2)_3OCH_2CH(O)CH_2$, polyoxyethylene oxypropylene groups such as $\equiv Si(CH_2)_3(OCH_2CH_2)_3[OCH_2(CH_3)CH]_3OH$, carboxyl groups such as $\equiv Si(CH_2)_3 COOH$, mercapto groups such as $\equiv Si(CH_2)_3SH$, and quaternary ammonium groups such as $\equiv SiC_4H_8NHC_2H_4NHCH_2CH(OH)CH_2N^+(CH_3)_3Cl^-$.

If desired, the inversion assisting polymer can be used as a mixture containing (i) a functional polydiorganosiloxane; with (ii) another silicone fluid with a lower molecular weight; and/or (iii) an organic compound such as a long chain alcohol. The mixture should be such as to have a ratio in which functional polydiorgansiloxane (i) is at least 70 percent by weight of the mixture.

An initial step in preparing emulsions according to the invention is to mix (i) the blend of the silicone resin and the non-resinous silicone polymer with (ii) the inversion assisting polymer, to form the oil phase of an emulsion. The oil phase should be prepared such that it includes 1–50 percent by weight, preferably 3–20 percent by weight, and most preferably 5–10 percent by weight of the inversion assisting polymer. The oil phase should also include 50–99 percent by weight, preferably 80–97 percent by weight, and most preferably 90–95 percent by weight of the blend of the silicone resin and the non-resinous silicone polymer. In preparing the oil phase, the blend of silicone resin and non-resinous silicone polymer should be mixed homogeneously with the inversion assisting polymer.

Emulsions according to this invention can be prepared using organic surfactant. The surfactants may be anionic surfactants, cationic surfactants, nonionic surfactants, amphoteric surfactants, or surfactant mixtures, Nonionic organic surfactants and anionic organic surfactants are especially preferred as mixtures containing an anionic and a nonionic surfactant, or as a mixtures containing two non-ionic surfactants. In the latter case, one nonionic surfactant should have a low Hydrophile-Lipophile Balance (HLB) while the other nonionic surfactant has a high HLB, such that the two nonionic surfactants have a combined HLB of 11–15, preferably 12.5–14.5. The effectiveness of the method of the present invention is most distinctive when nonionic surfactants are employed.

Representative of suitable anionic organic surfactants which can be used include alkali metal soaps of higher fatty acids, alkylaryl sulphonates such as sodium dodecyl benzene sulphonate, long chain fatty alcohol sulphates, olefin sulphates and olefin sulphonates, sulphated monoglycerides, sulphated esters, sulphonated ethoxylated alcohols, sulphosuccinates, alkane sulphonates, phosphate esters, alkyl isethionates, alkyl taurates, and alkyl sarcosinates. Some suitable cationic organic surfactants include alkylamine salts, quaternary ammonium salts, sulphonium salts, and phosphonium salts. Some suitable nonionic surfactants include siloxane polyoxyalkylene copolymers, the condensates of ethylene oxide with long chain fatty alcohols or fatty acids such as a $C_{12-16}$ alcohol, the condensates of ethylene oxide with an amine or an amide, the condensation products of ethylene and propylene oxide, esters of glycerol, sucrose, sorbitol, fatty acid alkylol amides, sucrose esters, fluorosurfactants, and fatty amine oxides. Some suitable amphoteric organic surfactants include imidazoline compounds, alkylaminoacid salts, and betaines.

Some commercially available nonionic surfactants most suitable according to the present invention include polyoxyethylene fatty alcohols sold under the tradename BRIJ by Uniqema (ICI Surfactants), Wilmington, Del. One example of this type of nonionic surfactant is BRIJ 35 Liquid, an ethoxylated alcohol also known as polyoxyethylene (23) lauryl ether. BRIJ 30 is another ethoxylated alcohol also known as polyoxyethylene (4) lauryl ether. Some additional and most suitable nonionic surfactants include the ethoxylated alcohols sold under the trademark TERGITOL® by The Dow Chemical Company, Midland, Mich. Some example include TERGITOL® TMN-6 which is an ethoxylated alcohol also known as ethoxylated trimethylnonanol, and TERGITOL® 15S15 which is an ethoxylated alcohol also known as $C_{12}$–$C_{14}$ secondary alcohol ethoxylate.

The method of making silicone resin emulsions according to the invention is carried out by adding the surfactant(s) to the oil phase containing the silicones, and agitating the oil phase with a conventional mixer. Water is then added to the oil phase containing the surfactant(s) in a stepwise fashion, such that catastrophic inversion occurs, and an oil-in-water emulsion is formed. It is also possible according to another embodiment for one or more of the surfactant(s) to be first dissolved or dispersed in water, and then the resulting aqueous solution or dispersion is added to the oil phase, which contains the same surfactant, a different surfactant, or no surfactant. In this instance, the amount of water used in the aqueous surfactant solution or dispersion for addition to the oil phase is such that it comprises a minimum or a slight excess of the minimum amount of water necessary to cause inversion. Typically, the amount of water required will be about 2–20 percent by weight of the oil phase. Moderate to high shear in a conventional mixer may be required to induce the inversion, however. The emulsion is then diluted with more water, or added with other additives such as biocides, thickeners, and freeze-thaw stabilizer, to form the final composition. The particle diameter of the silicones in such emulsions will typically be in a range of about 100–5,000 nanometer (0.1 to 5.0 micron), depending on the amount of surfactants and inversion assisting polymer used in the preparation.

Silicone resin emulsions according to the invention are capable of delivering performance properties such as controlled tack, lubrication, and assist in film formation. Thus, they can be used in coating applications, and in household, cosmetic and personal care applications, to provide greater durability, protective qualities, water resistance, and barrier properties. In some applications, it may be necessary to avoid the use of hydrocarbon-based solvents in delivering the silicone resin however.

EXAMPLES

The following examples are set forth in order to illustrate the invention in more detail.

Example 1

A blend was prepared by combining 30 percent by weight of a silanol containing MQ resin with an M/Q ratio of about 0.72, and 70 percent by weight of a hydroxyl terminated polydimethylsiloxane (PDMS) with a viscosity of about 2,000 centistoke (mm$^2$/s). A viscous solution was formed by mixing a solution of the MQ resin in xylene with the PDMS, and stripping off the xylene by vacuum distillation at an elevated temperature. 8.3 gram of a silicone quaternary amine was added to a beaker containing 40 gram of the MQ resin/PDMS viscous solution. The composition was homogeneously mixed with a Lightning mixer having a Cowles blade until it formed an oil phase. The silicone quaternary amine was a partially cationized aminofunctional polysiloxane carried in a small amount of a long chain alcohol. To the oil phase was added 8.16 gram of Brij 30 nonionic surfactant and 22.0 gram of Brij 35L nonionic surfactant. The phase was mixed at 800 RPM for 15 minutes. To the mixture was added 10.4 gram of deionized water, and it was sheared at 1200 RPM for 15 minutes. During this time, the mixture was inverted and formed an oil-in-water emulsion with a thick consistency. To the thick emulsion was added another 10.4 gram of deionized water, and the emulsion was sheared at 1200 RPM for another 15 minutes. The emulsion was then diluted with an additional 61.74 gram water, and mixed at 500 RPM for 30 minutes to form a white homogeneous emulsion. A Microtrac UPA 150 Particle Size analysis showed that the emulsion evidenced a mono-modal particle size distribution of silicone particles having a median particle diameter of 192 nm. The partially cationized aminofunctional siloxane functioned as the inversion assisting polymer in this Example.

Example 2

A single cup of a Hauschild Dental Mixer with a 22 second spin cycle was used to mix 11 gram of the MQ resin/PDMS blend in Example 1, and 1.0 gram of a composition containing a partially epoxidized amino-functional polysiloxane and a small amount of a long chain alcohol. The mixture was stirred with a spatula, after which it was spun for one cycle to form a clear mixture. 0.9 gram of Tergitol® TMN-6 nonionic surfactant and 2.1 gram of pre-warmed melted Tergitol® 15S15 nonionic surfactant, were added to the clear mixture, and then the mixture was stirred with a spatula and spun for one cycle. A homogeneous white and creamy mixture was formed. 1.56 gram of deionized water was added to the creamy mixture, it was stirred, and the mixture was spun for one cycle to form a translucent to clear soft mixture. The clear soft mixture was found to be readily dispersible in water, and this indicated that it had inverted by addition of the water to form a continuous phase. A 3.03 gram portion of water and a 4.41 gram portion of water were added in succession, and each time the composition was spun for one cycle. A white homogeneous emulsion was formed. A Microtrac UPA 150 Particle Size analysis showed that the emulsion exhibited a mono-modal particle size distribution of silicone particles with a median particle diameter of 343 nm. The partially epoxidized amino-functional siloxane functioned as the inversion assisting polymer in this Example.

Example 3

The contents of a single cup of a Hauschild dental mixer with a 22 second spin cycle containing 7.2 gram of the MQ resin/PDMS blend in Example 1, and 0.3 gram of a silicone polyether having polyoxyethylene oxypropylene units grafted to a polysiloxane backbone, was stirred with a spatula, followed by spinning for one cycle forming a clear mixture. 0.9 gram of Tergitol® TMN-6 and 2.1 gram of pre-warmed melted Tergitol® 15-S-15, were added to the clear mixture. The mixture was stirred with a spatula, after which it was spun for one cycle to form a homogeneous white and creamy mixture. 1.33 gram of deionized water was added to the white and creamy mixture, it was stirred, and the mixture spun for 3 cycles, forming a translucent gel. The gel was readily dispersible in water, indicating that the mixture had inverted by the addition of the water forming a continuous phase. 1.82 gram of water was added to the mixture and it was spun for one cycle. The mixture was soft and clear. Successive portions of 2.95 gram of water and 4.17 gram of water were added to the soft clear mixture, and the mixture was spun each time for one cycle forming a white homogeneous emulsion. A Microtrac UPA 150 Particle Size analysis showed that the emulsion exhibited a mono-modal particle size distribution of silicone particles with a median particle diameter of 371 nm. The silicone polyether functioned as the inversion assisting polymer in this Example.

Example 4

A second blend was prepared by combining 50 percent by weight of trimethyl endcapped MQ resin with an M/Q ratio of about 0.8, and 50 percent by weight of a trimethylsiloxy terminated PDMS with a viscosity of about 450 centistoke (mm$^2$/s). A viscous solution was formed by mixing a solution of the MQ resin in xylene with the PDMS, and stripping off the xylene by vacuum distillation at an elevated temperature. 0.5 gram of the partially cationized aminofunctional siloxane used in Example 1 and 5.5 gram of the MQ resin/PDMS blend were added to a single cup of a Hauschild dental mixer, stirred with a spatula, and spun for one cycle to form a clear mixture. 0.23 gram of Tergitol® TMN-6 and 0.53 gram of pre-warmed melted Tergitol® 15-S-15 were added to the cup, and stirred with a spatula. The mixture was spun for one cycle and formed a homogeneous white mixture. 1.19 gram of deionized water was added to the white mixture, it was stirred, and the stirred mixture was spun for one cycle forming a white mixture. The white mixture was readily dispersible in water, indicating that it had inverted by the addition of water forming a continuous phase. 4.05 gram of water was added to the composition and it was spun for one cycle forming a white homogeneous emulsion. A Microtrac UPA 150 Particle Size analysis showed that the emulsion exhibited a mono-modal particle size distribution of silicone particles with a median particle diameter of 932 nm. The partially cationized amino-functional siloxane functioned as the inversion assisting polymer in this Example.

Example 5

5.5 gram of the MQ resin/PDMS blend in Example 4 and 0.5 gram of the silicone polyether in Example 3 were added to a single cup of a Hauschild dental mixer with a 22 second spin cycle, stirred with a spatula, and spun for one cycle forming a clear mixture. 0.11 gram of Tergitol® TMN-6 and 0.23 gram of Tergitol® 15-S-15, pre-warmed to a melt, were added to the clear mixture, it was stirred with a spatula, and spun for one cycle forming a homogeneous translucent mixture. 1.33 gram of deionized water was added to the translucent mixture, it was stirred, and the translucent mixture was spun for 3 cycles forming a white mixture. The white mixture was readily dispersible in water, indicating that it had inverted by the addition of the water to form a continuous phase. 4.3 gram of water was added to the white mixture, and it was spun for one cycle forming a white homogeneous emulsion. A Microtrac UPA 150 Particle Size analysis showed that the emulsion exhibited a mono-modal particle size distribution of silicone particles with a median particle diameter of 1.8 μm. The silicone polyether functioned as the inversion assisting polymer in this Example.

Example 6

A third blend was prepared by mixing a solution of an MQ resin in xylene with a PDMS. The solution was composed of 70 percent by weight of a silanol containing MQ resin with an M/Q ratio of about 0.72, and 30 percent by weight of a hydroxyl terminated polydimethylsiloxane having a viscosity of about 64 centistoke (mm²/s). The xylene in the solution was stripped by vacuum distillation at an elevated temperature to form a viscous solution. 5 gram of the third blend of MQ resin/PDMS was added to a single cup of a Hauschild dental mixer with a 22 second spin cycle, and the blend was warmed until it was flowable. One gram of the partially cationized amino-functional siloxane in Example 1 was added to the cup, and the mixture was stirred with a spatula, and then spun for one cycle. 0.9 gram of Tergitol® TMN-6 and 2.1 gram of Tergitol® 15-S-15, pre-warmed to a melt, were added to the spun mixture. The mixture was warmed until it could be stirred with a spatula, and then it was spun for one cycle. This procedure was repeated in order to form a homogeneous white mixture. 1.61 gram of deionized water was added to the white mixture and it was stirred. The white mixture was spun for one cycle forming a clear and soft mixture. The mixture was readily dispersible in water indicating that it had already inverted by the addition of water as a continuous phase. Successive portions of 3.13 gram of water and 2.76 gram of water were added to the composition, and each time the mixture was spun for one cycle forming a white homogeneous emulsion. A Microtrac UPA 150 Particle Size analysis showed that the emulsion exhibited a bi-modal particle size distribution of silicone particles with 90 percent by volume of the silicone particles having a median particle diameter of 1.19 μm, and 10 percent of the silicone particles having a median particle diameter of 4.84 μm. The partially cationized amino-functional siloxane functioned as the inversion assisting polymer in this Example.

Comparative Example 1

6 gram of the MQ resin/PDMS blend in Example 1, and a pre-warmed melt of 0.9 gram of Tergitol® TMN-6 and 2.1 gram of pre-warmed melted Tergitol® 15-S-15, were added to a single cup of a Hauschild dental mixer with a 22 second spin cycle, stirred with a spatula, and spun for one cycle forming a homogeneous white and creamy mixture. 1.2 gram of deionized water was added to the creamy mixture and it was stirred. The water was not wetted into the mixture even when it was vigorously stirred. The mixture was spun for one cycle and formed a separate aqueous phase and a separate oil phase. However, no emulsion was formed. This is because no inversion assisting polymer was used in this Example. This poor result should be contrasted to the good results obtained in Examples 1–3.

Comparative Example 2

6 gram of the MQ resin/PDMS blend in Example 4, 0.23 gram of Tergitol® TMN-6 and 0.53 gram of pre-warmed melted Tergito® 15-S-15, were added to a single cup of a Hauschild dental mixer with a 22 second spin cycle. The mixture was stirred with a spatula, after which it was spun for one cycle forming a homogeneous white and hard mixture. 1.27 gram of deionized water was added to the white hard mixture, and it was stirred. The water was not wetted into the mixture even after vigorous stirring. The mixture was spun for 3 cycles and formed a separate aqueous phase and a separate oil phase. No emulsion was formed. This is because no inversion assisting polymer was used in this Example. This poor result should be contrasted with the good results obtained in Examples 4–5.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of making an aqueous silicone resin containing emulsion comprising the steps of:
   (i) mixing a silicone resin or a blend of a silicone resin and a non-resinous silicone polymer, with an inversion assisting polymer to form a homogeneous oil phase;
   (ii) mixing one or more surfactants with the homogenous oil phase in (i) to form a mixture;
   (iii) adding sufficient water to the mixture in (ii) to cause an inversion of the continuous phase and the dispersed phase, and forming an oil-in-water emulsion;
   (iv) diluting the oil-in-water emulsion in (iii) by adding more water; and
   (v) recovering an oil-in-water emulsion containing silicones having a particle size in range of 100–5,000 nanometer (0.1–5.0 micron); the inversion assisting polymer being a silicon functional or an organofunctional polysiloxane having the formula:

wherein R' represents the same or a different monovalent hydrocarbon groups having 1–6 carbon atoms; R", R'" and R"" each represent the same or a different silicon functional or organofunctional group selected from the group consisting of a hydroxyl group, an alkoxy group, an amino group, an epoxidized amino group, a glycidyl group, a polyoxyethylene oxypropylene group, a carboxyl group, a mercapto group, a quaternary ammonium group, or a combination thereof; the silicon functional group being directly linked to silicon atoms, and the organofunctional group being linked to silicon atoms via a divalent alkylene linking radical; a is 0 or 1; and the ratio of x to (y+z) is 99.5:0.5 to 90:10.

2. A method according to claim 1 wherein the non-resinous silicone polymer is a linear or a cyclic polydiorganosiloxane of Tg below −20° C. containing hydrocarbon or functional substituted hydrocarbon groups having 1–6 carbon atoms, and a viscosity of 0.65–60,000 centistoke (mm₂/s).

3. A method according to claim 2 wherein at least 80 percent of the hydrocarbon groups are methyl groups and the polydiorganosiloxane is terminated by hydroxyl or trimethylsiloxy groups.

4. A method according to claim 1 wherein the blend of the silicone resin and the non-resinous silicone polymer is mixed at a ratio of resin to non-resinous polymer in the range 5:95 to 95:5 by weight.

5. A method according to claim 1 wherein the blend of the silicone resin and the non-resinous silicone polymer in (i) is in the form of a silicone pressure sensitive adhesive.

6. A method according to claim 1 wherein the inversion assisting polymer is incorporated at a level from 1–50 percent based on the total weight of the oil phase.

* * * * *